July 24, 1934.    K. A. FERKEL    1,967,235
METHOD AND APPARATUS FOR PRODUCTION OF METAL OXIDES
Filed Sept. 8, 1931    4 Sheets-Sheet 1

INVENTOR.
Karl A. Ferkel,
BY
ATTORNEYS.

July 24, 1934. K. A. FERKEL 1,967,235
METHOD AND APPARATUS FOR PRODUCTION OF METAL OXIDES
Filed Sept. 8, 1931 4 Sheets-Sheet 3

INVENTOR.
Karl A. Ferkel
BY
ATTORNEYS.

July 24, 1934.  K. A. FERKEL  1,967,235

METHOD AND APPARATUS FOR PRODUCTION OF METAL OXIDES

Filed Sept. 8, 1931  4 Sheets-Sheet 4

INVENTOR.
Karl A Ferkel,
BY
ATTORNEYS.

Patented July 24, 1934

1,967,235

UNITED STATES PATENT OFFICE 1,967,235

METHOD AND APPARATUS FOR PRODUCTION OF METAL OXIDES

Karl A. Ferkel, Los Angeles, Calif.

Application September 8, 1931, Serial No. 561,596

27 Claims. (Cl. 23—202)

This invention relates to the production of metal oxides in finely divided form and, more specifically, to the production thereof by methods involving hydrolysis of metal halides by bringing vapors of such halides into contact with water vapor.

An important object of this invention is to provide for the production of metal oxides of such purity, crystalline structure, particle size and color as to be of value as pigments in paint, ceramic and similar industries. A further object is to make possible the manufacture of such oxides in a pure state, free from acid and other impurities, without the need of such operations as precipitation, filtering, washing and drying, as is necessary in processes where pigments are produced through the medium of aqueous solutions. Such oxides are referred to hereinafter as "acid-free", this term being used to designate an oxide which is essentially free from acid, either uncombined or in chemical combination therewith. Furthermore, the term "oxide" as used herein is to be understood to include either an oxide, an oxide containing water of crystallization, or a hydroxide. This invention deals particularly with the manufacture of the oxides of iron, titanium, silicon and similar elements having halides which can be vaporized and reacted with water vapor and discloses in detail methods by which the vapors can be reacted to produce desirable products.

Another object of the invention is to prevent the formation of encrusted particles containing non-hydrolyzed or partially hydrolyzed metal halide, during the hydrolyzing reaction, which has heretofore been a common cause of the formation of impure products.

Another object is to form metal oxide in hydrated or partially hydrated condition, which facilitates subsequent removal of small amounts of gaseous hydrogen halide mechanically held between the oxide particles, as hereinafter described.

Another object of the invention is to provide for the production of the major portion of the hydrogen halide formed in the hydrolyzing reaction, in anhydrous condition, so as to permit reutilization thereof for the production of additional metal halide, in cyclic operation, or permit advantageous recovery and sale of such hydrogen halide.

A further object of the invention, in certain cases, is to directly produce mixed or combined oxides of two or more different metals, in which the different metal oxides are more intimately mixed or combined than is the case when the oxides are produced separately and then mechanically mixed together.

In order to simplify the specifications which describe this invention, the element chlorine will be considered as representative of the halogen group, but it is to be understood that the scope of this invention is not limited to any one element of the halogen family. It will also be understood that where reference is made hereinafter to hydrochloric acid any other halogen acid may be substituted, and that where reference is made to hydrogen chloride any other hydrogen halide may be substituted.

It has already been proposed to react the vapors of an anhydrous metallic halide with water vapor. One investigator proposes a means of manufacturing hydrochloric acid by impinging a jet of chloride vapor, such as silicon tetrachloride, upon a jet of water vapor. The specified arrangements of jets and temperature are such that the hydrochloric acid formed passes out through the top of the reaction chamber, while the oxide forms as a loose incrustation of crystals which fall to the bottom of the reaction chamber. Investigation has shown that an oxide formed in such a manner has little value for pigment purposes, due to the formation of compounds contaminated with acid, either as such or in chemical combination therewith, and because it does not have the proper crystalline structure, or a desirable color.

Other investigators have unsuccessfully tried to improve the quality of the oxide produced by mixing a vaporized chloride with water vapor through the use of mechanical mixing devices, such as rapidly rotating blades; while others have proposed a high temperature of reaction and the washing of the oxides produced in water as a means of removing the acid. As far as is known, no such methods have been practically used on a technical scale, due primarily to the inferior physical structure of the product and the difficulty of obtaining it in an acid-free state.

In order to fully understand the difficulties encountered and the importance of this invention, it is necessary to consider the specifications which a pigment must meet in order to be acceptable to the paint industry, and to study in detail the reaction between a metal chloride vapor and water vapor.

To be specific, manufactured or synthetic ferric oxide finds a broad application as a pigment and in order to be acceptable to the discriminating industry, must meet certain standards of color, covering power, fineness, density and be substantially free from acids and other impurities. In color, ferric oxide may vary from a dark, unattractive, almost black shade to a light, attractive yellow red, and its value as a pigment depends to a great extent upon its attractiveness as to color. If ferric oxide is properly made in such manner as to be of a light yellow-red shade, it can be converted into a brilliant light red by calcining properly. Darker shades of red and purple are created through more extensive calcination. Any method which produces a dark, unattractive oxide is of no value, as calcination or any subsequent treatment cannot convert it into a lighter color, and the dark, unattractive shades have little use as a pigment.
If vaporized ferric chloride and water vapor be introduced into a reaction chamber and the vapors be allowed to react and contact through diffusion, or be reacted in such a manner as proposed by previous investigators for the reacting of a chloride and water vapor, the product formed will be contaminated with unhydrolyzed ferric chloride, basic chlorides and other acid-laden compounds, and such ferric oxide as is formed is of a dark color. Calcination, although it breaks down some of the compounds into oxides and acids, does not improve the color nor make the product suitable for pigment purposes.
Close investigation of the actual reaction between ferric chloride vapor and water vapor shows the tendency towards the formation of incrusted masses, which are not ferric oxide but which may consist largely of mixed compounds of the nature of $FeCl_3.Fe_2O_3$ or $2FeCl_3.3Fe_2O_3$ or physical mixtures of ferric oxide and unhydrolyzed ferric chloride. The subjecting of such masses to further treatment with water vapor does not complete their reaction into the oxide and free acid, and it is believed that the difficulty of effecting this conversion is caused not only by the factors of chemical equilibria and rates of reaction involved, but also the further fact that, due to the incrusted structure, the water vapor cannot easily gain access to and contact with their interiors. These incrusted masses may be of microscopic size or grow into large lumps which fall to the bottom of the reaction chamber. Obviously, for production of desirable products, the vapors should, therefore, be reacted so that such incrusted masses cannot form.
Ferric chloride in the form of a vapor is very active chemically and if the method of reaction is such that the vapor contacts other materials, such as ferric oxide, it may result in the formation of such compounds as oxy or basic chlorides. For this reason, it is best to react the vapors in such a manner that once ferric oxide is formed it is immediately removed from any continued contact with ferric chloride vapor. Another point to be considered is the possibility of ferric chloride forming hydrated chlorides, or at least passing through such a stage so as to result in the formation of an oxide not suitable for pigment purposes. The reaction must take place so that the ferric oxide formed will be of the desired light yellow-red shade and have such properties of fineness and density as required by a high-grade pigment.
The paint industry also recognizes titanium dioxide as a superior pigment when it has certain properties of whiteness, physical structure, and is free from acid and other impurities. Any process which produces titanium dioxide not having the desired property of whiteness is of little value, as the exceptionally white appearance of the titanium dioxide has more to do with its fitness for use as a pigment than any other property, provided, of course, it is in the acid-free state.
Numerous investigators have felt that a suitable oxide of titanium for use as a pigment could be prepared through the reaction of titanium tetrachloride vapor and water vapor, but were unable to react the vapors in such a manner so as to produce an oxide free from acid and acid compounds. While such an oxide as was produced could be made substantially acid-free by washing and extensive calcination at elevated temperatures, it did not have the desired property of whiteness, to be acceptable to the industry.
Careful investigation has shown that titanium tetrachloride reacts with water vapor to form a series of compounds, the nature of which is dependent upon the temperature of reaction, proportionate amounts of reacting compounds and methods of contacting the vapors. For example, when reacting the vapors, a hydrated form of titanium tetrachloride may form, having the formula $TiCl_4.5H_2O$, which may on contact with more water vapor be hydrolyzed into such basic chlorides as $TiCl_3(OH)$ or $TiCl_2(OH)_2$ or $TiCl(OH)_3$ or other compounds, which, when calcined, do not give pure titanium dioxide, but form titanium compounds which are not white in color and are not desirable as pigments. Careful investigation has shown that the difficulties encountered in hydrolyzing titanium tetrachloride into desirable titanium dioxide are of the same nature as exist when ferric chloride vapor is hydrolyzed into ferric oxide, and similar precautions must be taken to overcome the formation of incrusted masses and such compounds as will render the product unfit for pigment purposes.
I have found that the above difficulties may be overcome, and metal oxides free from acid and having highly satisfactory color and other properties may be produced, by reacting the metal chloride and water vapors in accordance with the present invention and, while the discussion of the difficulties ordinarily encountered, and of the means by which such difficulties are overcome by this invention, are directed particularly to the case of ferric oxide and titanium dioxide, it will be understood that similar difficulties are encountered and may be similarly overcome in the production of other metallic oxides.
This invention consists chiefly of a new method of converting vaporized metallic chlorides into oxides by contacting such vaporized chlorides with water vapor at a suitable temperature, under conditions of high relative velocity and great turbulence, which instantly converts the chloride into an oxide of such fineness that it remains suspended in the gaseous product of the reaction and floats out of the reaction zone, and is thereby carried away from the incoming chloride vapors. The turbulent dispersive action completely eliminates any incrusted masses and causes the formation of an acid-free oxide, or in some cases, the formation of a partially hydrolyzed product whose physical condition is such as to facilitate complete hydrolysis and production of an acid-free oxide in a subsequent hydrolyzing operation.
If the vapors of ferric chloride and water are reacted as disclosed in this invention, the ferric oxide formed is a beautiful light color, is free from all acid and acid products, and is of the desired fineness, density and purity, and if the disclosed means of reacting vapors is applied to titanium tetrachloride vapor and water vapor, the oxide produced may be calcined into an exceptionally white, acid-free dioxide.

A preferred method of reacting the vapors in order to attain the desired action is to introduce the water vapor into a reaction chamber in such a manner as to establish a zone or area of the required turbulent, dispersive nature. A slowly moving stream of the chloride vapor is then passed into the turbulent zone, to be reacted into oxide. The oxide is then caused to float away from the position of introduction of the chloride vapor, out of the reaction zone and chamber, and is subsequently separated from the gaseous products of reaction. However, it is not desired to limit this invention to the use of the introduced water vapor as a means of creating the turbulent, dispersive action required. Observation has shown that if either of the reacting vapors is in the turbulent form, the action takes place so as to produce a desirable product. One method of acquiring such a turbulent dispersive action is the introduction of the water vapor through the use of such dispersing orifices as will be hereinafter described. Satisfactory results, however, can also be obtained if the chloride vapor, or both vapors, be introduced into the reaction in the turbulent form. As another alternative, a third gas or vapor may be introduced through a separate orifice or through separate orifices in such a manner to cause the turbulent dispersive action at the point of reaction.

Experience has shown that the introduction of the water vapor offers the simplest means for attaining the necessary turbulence and dispersion, and for this reason the specific description hereinafter and the illustrative drawings accompanying this application will be based on water vapor introduction as the means of acquiring the necessary turbulent action, but it is to be understood that this invention is not limited to any one particular method of bringing about the desired turbulence and dispersive action at the region of reaction between the chloride vapor and water vapor.

The actual temperature of reaction between a chloride vapor and water vapor is important. According to the present invention, such temperature of reaction is maintained above the boiling temperature of the chloride vapor and also of water and hydrochloric acid in order that they will remain in the form of a vapor. In some cases other factors may also impose additional limitations on the temperature of reaction. As for example, a maximum limit of the temperature of reaction must generally be observed, due to the fact that some chlorides tend to dissociate and form undesirable products at temperatures appreciably above their boiling points and, as a general rule, it is usually desirable to maintain the temperature of reaction sufficiently low so that the oxide formed will be in a hydrated state.

Considering a specific case of a temperature limitation imposed by the tendency of a chloride vapor to dissociate, ferric oxide may be made by reacting the vapor of ferric chloride with water vapor in accordance with the equation $2FeCl_3 + 3H_2O = Fe_2O_3 + 6HCl$. In order to find the best temperature of reacting the vapors, investigation has shown that ferric chloride has a boiling point of approximately 307° C., and while, due to sublimation, it vaporizes below that temperature, it is well to consider its boiling point or vaporization point at 307° C. It is obvious that at any temperature appreciably below that temperature, some ferric chloride would exist in the crystalline state. Hence, the minimum temperature at which the reaction can take place with ferric chloride as a vapor is set at approximately 307° C. When heated, ferric chloride dissociates into ferrous chloride and free chlorine, as indicated by the equation $2FeCl_3 = 2FeCl_2 + Cl_2$. This dissociation is perceptible at 125° C., but is very small at that temperature, becoming objectionable only at temperatures above 400° C. Inasmuch as ferrous chloride reacts with water vapor in accordance with the equation $3FeCl_2 + 4H_2O = Fe_3O_4 + 6HCl + H_2$ and $Fe_3O_4$ is not desirable to mix with ferric oxide, if a desirable color is to be obtained, it is essential that the formation of ferrous chloride be eliminated. The introduction of free chlorine into the ferric chloride vapor before its reaction with water vapor tends to retard its dissociation and the formation of ferrous chloride, and to produce excellent results, but observation has shown that, if the temperature of reaction be kept just above the boiling point of ferric chloride, the dissocation due to temperature is not sufficient to cause difficulty. For example, experience has shown that a reaction temperature of approximately 325° C. produces satisfactory products.

The reaction of titanium tetrachloride and water vapor presents a slightly different problem in that it is possible to react titanium tetrachloride vapor and water vapor at a temperature below the boiling point of titanium tetrachloride. This can be done by saturating an inert gas with titanium tetrachloride vapor and reacting such vapor with water vapor. The vapors of titanium tetrachloride and water vapor may be reacted in this manner at a low temperature, for example, 25° C. At this temperature, the reaction proceeds as indicated by the equation $$TiCl_4 + 4H_2O = Ti(OH)_4 + 4HCl,$$

and the hydrogen chloride condenses with any water vapor present. It is exceedingly difficult, however, to produce an acid-free oxide under such conditions, and it is therefore advantageous to conduct the reaction at a temperature above the condensation point of hydrogen chloride and water. Furthermore, if the temperature of the reaction be kept above the condensation point of hydrochloric acid and water, the apparatus may be made out of such metals as become passive in gaseous hydrogen chloride, such as aluminum.

The boiling point of titanium tetrachloride is approximately 136° C., and experience has shown that a preferred operating temperature is approximately 140° C., as at this temperature the tetrachloride can be vaporized and the reaction with water vapor takes place so as to form a hydrated oxide, and the other products involved in the reaction remain in the vapor state.

The reason it is desirable to react the vapors at a temperature sufficiently low to form a hydrated oxide is that it offers a means of freeing the oxide of any acid or chloride intermixed with the oxide when it leaves the reaction apparatus. For example, when ferric oxide or titanium dioxide is removed from the apparatus after being separated as free as possible from the gaseous hydrogen chloride, the oxide contains small amounts of hydrogen chloride, held mechanically between the solid particles. When calcined, the acid tends to react with the oxide and render it unfit for pigment purposes. If the oxide, before calcination, is in the form of a hydrate, as indicated by the formula $Fe_2O_3.H_2O$ or $2Fe_2O_3.H_2O$ in the case of ferric oxide, or

$TiO_2.H_2O$ in the case of titanium dioxide, the water of hydration is driven off in the early stages of calcination, diffusing between the solid particles as a vapor, and displacing hydrogen chloride. This also tends to hydrolyze any metal chloride which may not be completely reacted.

It is possible to react titanium tetrachloride vapor and water vapor at a temperature sufficiently high to form the dehydrated oxide direct, or to pass the products of reaction directly into a heated chamber so as to effect calcination. Under such conditions, however, titanium dioxide becomes so impregnated with the acid as to be exceedingly hard to make acid-free, and is often not of the desired whiteness.

In general, therefore, while it is true that reacting a chloride vapor and water vapor in such a manner as disclosed in this invention, results in a superior product at any temperature, the preferred reaction temperature is above the condensation point of hydrochloric acid and water and below the dehydrating temperature of the oxide formed, and is also only slightly above the vaporizing temperature of the metal chloride used in the reaction.

An essential feature of this invention is the fact that the oxide is produced in a finely divided state and is carried out of the reaction zone in suspension in the vapor formed by the reaction and subsequently separated from such vapor. For this reason, the temperature of the reacting vapors and reaction chamber must always be above the condensation point of any of the vapors existing in the system. The reacting of the vapors so as to produce a fine oxide and the suspension of the oxide in the gaseous products of the reaction makes it possible to remove the oxide from any continued contact with the chloride vapor and tends to eliminate any such reaction as may result from contacting the chloride vapor in its highly active state with the oxide and other products of reaction.

Experience has also shown the advisability of the immediate separation of the oxide from the gaseous acid, formed when a chloride vapor is reacted with water vapor, as many such reactions are reversible in their nature, of which the proposed preparation of iron oxide is an example. The reaction as indicated by the equation $$2FeCl_3 + 3H_2O \rightleftharpoons Fe_2O_3 + 6HCl$$

is reversible, and, under certain conditions of temperature and concentration, the hydrochloric acid reacts with the ferric oxide to render it unfit for pigment purposes. The tendency of the hydrogen chloride to react with the oxide becomes greater in the presence of water vapor, and at elevated temperatures; therefore, it is desirable to keep the products and the apparatus which contacts the mixture of hydrochloric acid, ferric oxide, and any water vapor which may be present, at as low a temperature as possible without condensation, and to separate the oxide from the acid gas as soon as possible.

Furthermore, I find it advantageous, in order to prevent reaction on the metal oxide of hydrogen chloride mechanically mixed therewith, to prevent cooling thereof below the condensation temperature of hydrochloric acid prior to calcination; in other words, to subject the product obtained by hydrolysis, without intermediate cooling, directly to calcination, as I have found that if the hydrolyzed product, before calcination, is allowed to cool sufficiently to cause condensation of hydrochloric acid in contact therewith, there is a tendency to formation of compounds which are difficult to eliminate by subsequent calcination and which are detrimental to the properties of the final product.

The means of reacting the vapor as disclosed not only produces desirable oxide but also permits the hydrolysis to be advantageously carried out under such conditions as to produce anhydrous hydrogen chloride. Introducing the vapors in exact theoretical combining proportions and completely reacting them through the methods disclosed in this invention results in the formation of anhydrous hydrogen chloride, which may be used cyclically to produce more chloride or may be compressed and stored in cylinders in a manner similar to the present practice of the anhydrous chlorine industry. In order for such a process to be successful, it is essential that the gaseous acid be essentially free from any water vapor.

If the vapors are introduced in exactly their combining proportions, the disclosed method of reaction is so complete that anhydrous hydrogen chloride is formed, but experience has shown the difficulty of admitting the vapor in exact proportionate amounts. Any excess of water vapor would obviously result in the recovery of an aqueous solution of hydrochloric acid and would thus be disadvantageous. However, if excess metal chloride vapor is used, it becomes partially hydrolyzed, and, after its separation from the dry hydrogen chloride, may be reacted with more water vapor and completely hydrolyzed into pure oxide. As the disclosed method of reacting the metal chloride vapor with less than the theoretical amount of water vapor produces a partially hydrolyzed product, which is easily hydrolyzed into the oxide, it is possible to produce anhydrous hydrogen chloride and also obtain completely hydrolyzed metal oxide, by means of a process involving two-stage hydrolysis. This is done by first reacting the metal chloride and water vapors in such proportion that there is a slight excess of chloride vapor over that required to combine with all the water vapor present at the reacting temperature. The resulting dry hydrogen chloride is separated from the mixture of oxide and partially hydrolyzed products which are again subjected to treatment with water vapor. This second treatment may be effected by subjecting said mixture to a blast of superheated water vapor, having the turbulent, churning properties previously disclosed, or by heating it in a closed chamber and treating with superheated steam under pressure. In the treatment of the partially hydrolyzed product, to complete the hydrolysis and remove any acid, the use of the blast of superheated steam is very effective. The product may be caused to fall directly in front of orifices discharging superheated water vapor in such a turbulent, high-velocity manner, as to completely destroy any cohesion between any particles, so that complete hydrolysis takes place. The resulting products, which are oxide, water vapor and a small percentage of hydrochloric acid, are separated and the oxide calcined.

The production of anhydrous hydrogen chloride is essential in order that it may be used in a cyclic manner to produce additional metallic chlorides, and such cyclic use of the hydrogen chloride produces metallic oxides in an economical manner heretofore impossible.

Iron may be converted into ferric chloride by reacting chlorine on metallic iron, as indicated by the equation $2Fe+3Cl_2=2FeCl_3$. Approximately two-thirds of the chlorine necessary may be replaced by hydrogen chloride, as when the reaction is carried on as indicated by
$$4HCl+Cl_2+2Fe=2FeCl_3+2H_2.$$
Such substitution of hydrochloric acid for chlorine will cause great economies when the chlorine has substantially greater value than the hydrochloric acid.

The production of such chlorides as titanium tetrachloride illustrates a preferred means of the cyclic use of anhydrous hydrochloric acid, in which the entire amount of acid resulting from the hydrolysis of the chloride may be reacted on titanium compounds to produce a proportionate amount of titanium tetrachloride as, for example, $TiC+4HCl=TiCl_4+2H_2+C$.

In some cases, a superior oxide may be produced in accordance with this invention, through the dilution of the vapors before they are reacted in such a manner as disclosed. The diluting gas may be an inert gas such as air and may be introduced into the reacting vapors so as to cause the formation of an oxide of exceptional fineness and superior properties. As will be disclosed in the description of a preferred embodiment, the inert gas may have the additional function of causing the reacting vapors to flow in an orderly manner, conducive to the formation of desirable oxide.

The means of introducing the water vapor may have a definite bearing on the type of oxide produced. For example, the water vapor may be introduced as superheated steam, or may be introduced through the medium of another gas, such as air charged with water vapor. When air is used to carry the water vapor into the reaction, it can be bubbled through water until it becomes saturated, or a suitable air-water mixture may be prepared by introducing a carefully measured amount of water or water vapor into a definite amount of air, and the resulting mixture of air and water vapor is introduced through such orifices as to create the desired turbulent, dispersive action. The air, when used to carry the water vapor has a definite part in the mechanics of the reaction. For example, if the air is saturated at forty degrees (40°) centigrade, it will contain approximately 5% water by weight, while the volumes are in the approximate proportion of 15 volumes of air to 1 volume of water vapor. Assuming that the air does not enter into the reaction chemically, there exists 15 volumes of inert gas in a highly dispersive form, to effect a churning, stirring and diluting action on the reacting vapors.

Another advantage of the disclosed method of converting vaporized chlorides into oxides is the fact that an intimate mixture of oxides of different metals may be formed by the hydrolyzing of a mixture of chlorides. For example, silicon chloride, when hydrolyzed in such a manner as disclosed, produces an oxide which has many properties required for a pigment, but is not as desirable as titanium dioxide. Silicon dioxide, on the other hand, by virtue of the great abundance of the crude oxide, can be prepared more cheaply than titanium dioxide. Investigation has shown that if a mixture of vapors of titanium tetrachloride and silicon chloride is reacted in such a manner as disclosed for reacting a chloride vapor and water vapor, the resulting oxide, which may contain as much as 75% silicon oxide, is comparable to titanium dioxide as a pigment, while even an amount of titanium dioxide less than 5% is very effective in improving the quality of silicon oxide when the mixture is prepared in accordance with this invention, and it is obviously much cheaper to prepare such a mixed oxide than to prepare pure titanium dioxide. Whether the product obtained in this manner is a physical mixture or a chemical combination of oxides, it is extremely desirable for use in the paint industry.

This invention comprises not only the novel methods of producing metal oxides as above disclosed and described in more detail hereinafter, but also certain novel and advantageous apparatus for use therein.

The accompanying drawings illustrate certain embodiments of apparatus in accordance with this invention, and referring thereto.

Figures 1, 3, 4, 5:
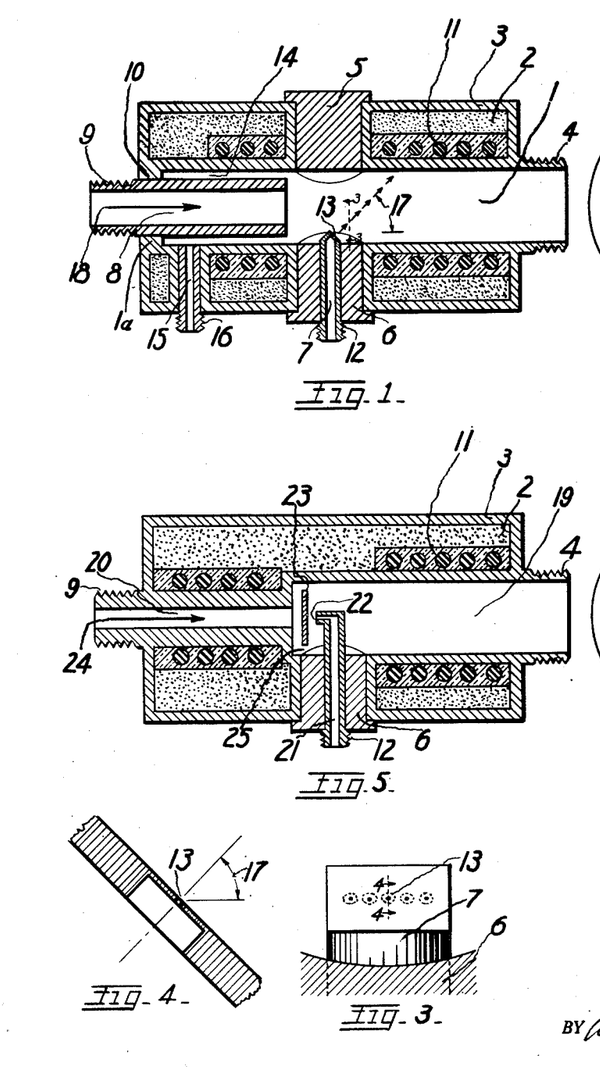
Fig. 1 is a central longitudinal sectional view of one type of hydrolyzing apparatus, in which the vapors of a chloride and water vapor may be reacted as disclosed.
Fig. 3 is a sectional view on line 3—3 in Fig. 1, showing the orifice member through which the water vapor is introduced into the reaction chamber illustrated in Figs. 1 and 2.
Fig. 4 shows a cross-section of the orifice member at the line 4—4 in Fig. 3.
Fig. 5 is a central longitudinal sectional view of a modified form of such apparatus.
Figure 2:
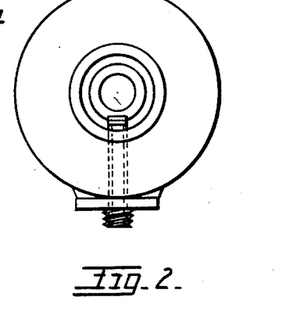
Fig. 2 is an end view of the same apparatus.
Figure 6:
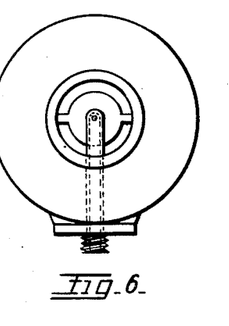
Fig. 6 is an end view of the apparatus shown in Fig. 5.

Referring now to Figs. 1 and 2, which illustrate one form of apparatus in which metal chloride and water vapors are reacted and on which similar reference characters indicate similar parts. The apparatus consists of a cylindrical chamber 1 thermally insulated by the insulation medium 2 which is held in place by the shell 3. The cylindrical chamber 1, which is essentially a pipe, is threaded at 4 so as to be attached to any other apparatus as may be necessary. The threaded end of said chamber is open, and the other end closed as at 1a. At the top of the chamber 1 and approximately at its mid-point, is an inspection plug 5, which may be removed. In a corresponding position, but at the bottom of the chamber 1, is a similar plug 6, which may also be removed, and serves as a base and means of attachment for the water vapor inlet 7. The vaporized chloride is introduced by means of the inlet pipe 8, which is threaded at 9, so as to be attached to the source of supply, and which extends through the closed end of chamber 1 and into the interior thereof and is attached firmly to the chamber 1 at 10. The entire apparatus may be heated to any desired temperature through the use of the electric heating elements 11 embedded in electrical insulation which surrounds the chamber 1. The water vapor inlet 7 has a threaded end 12, to which the means of supplying water vapor is attached. The water vapor is released through the sharp edged orifices 13, which will be subsequently described in detail. The outside diameter of the chloride inlet pipe 8 and the inside diameter of the chamber 1 are so related as to leave an annular passage 14, to which is connected an inlet pipe 15, into which a gas may be introduced through the connection 16.

Fig. 3 shows an enlarged end view of the orifice member of the inlet pipe for introducing the water vapor, and Fig. 4 shows in detail a suitable method for constructing the orifices, which are of the nature of "sharp-edged orifices". The object is to cause the water vapor to be ejected in turbulent (eddy) motion. It is known that if steam or, in general, any elastic fluid, flows through a simple orifice from a space of higher into one of lower pressure, the pressure in the orifice will decrease and there will occur in the stream after leaving the orifice strong pulsations or vibrations, which, under increased initial pressure, become highly turbulent in nature. In reacting the vapors of a chloride with water vapor, there are certain definite combining ratios of the vapors, which means that the amount of water vapor which can be introduced is limited. Hence, it is desired to obtain a maximum turbulence, using a minimum amount of water vapor, and it is necessary to construct the orifices so that a maximum turbulence is obtained with a minimum initial pressure. Experience has shown that the construction of the orifices as illustrated in Fig. 4 is satisfactory.

Even when constructed so as to create as much turbulent motion as possible, the orifice has what may be termed a "critical" velocity, as in the case of every fluid discharged from an orifice, as the velocity is increased, some point is reached where the type of motion suddenly changes from straight line motion to a motion known as turbulent motion, which is characterized by the presence of innumerable eddy currents in the stream. The velocity at which the type of motion changes from straight line to turbulent flow is called the "critical velocity", and in practice is determined to a great extent by the type of orifice through which the fluid is ejected. If, when a chloride vapor and water vapor are reacted, the water vapor be introduced through an orifice below its critical velocity, the product formed is not satisfactory, even though the water vapor is in excess. The introducing of the water vapor at higher velocity than the critical velocity tends to produce excellent products. Hence, it is desirable to construct the orifices in such a manner that they have a low critical velocity, or, in other words, to construct the orifices to get a maximum high velocity of turbulent motion, using a minimum amount of introduced vapor. The embodiment as shown by Fig. 3 indicates a plurality of orifices. In practice, excellent results can be obtained from a single orifice, but the provision of a plurality of orifices is to be preferred as it lessens the danger of the outlet being plugged. In this particular embodiment, the water vapor injection orifices are so ararnged that the angle 17 between the direction of flow through said orifices and the axis of the chamber 1 is approximately 45°. This creates an active reaction zone across substantially the entire area of the chamber 1 and, due to the aspirating effect of the water vapor leaving the orifices, causes the chloride to be drawn into the reaction zone and after the reaction has taken place, tends to force the products away from the reaction zone.

Fig. 5 shows a sectional view of another apparatus in which the hydrolyzing process of this invention may be carried out. This form of apparatus consists of a cylindrical chamber having a portion 20 of relatively small diameter and a portion 19 of relatively large diameter, as indicated by the drawings. The chamber 20 of the smaller diameter serves as a means of introducing the chloride vapor and is threaded at 9 for attachment to a source of supply. The large diameter portion 19 of the chamber is essentially the reaction zone, where a reaction between the chloride vapor and the water vapor takes place, and is also threaded at 4 for connection to other apparatus. The water vapor is introduced through the inlet pipe 21 and ejected through the jet 22 to impinge and spread against the circular disc 23, which is firmly suspended in a central position in the circular chamber 19 in such manner that the chloride vapor, which is introduced and flows as indicated by the arrow 24, is caused to flow through the annular passage 25 formed between the outer edge of the disc 23 and the wall of the chamber 19. The water vapor is ejected against the disc 23 with such force as to cause a blast of great velocity and turbulence which completely fills the annular passage through which the chloride vapor must pass. The smaller diameter chamber 20, which serves as an inlet tube for the chloride vapor, is kept clean and free from solid matter by the velocity of the chloride vapor. Other parts of this modification are the same as Fig. 1 and are correspondingly numbered.

It is apparent that other types of apparatus may be suggested which accomplish the same result disclosed in the two embodiments described. The chamber in which the chloride vapor is reacted against the water vapor need not be circular in cross-section area, but may be of any other suitable shape, and the water vapor may be introduced through a plurality of inlet pipes and orifices, or may be introduced through a single orifice in the form of a slit, which will produce a sheet of water vapor across the entire area of the reaction zone.

Other changes will suggest themselves in the embodiments as described. For example, in Fig. 1, the inspection plug 5 may be removed and a suitable means of scraping the chloride inlet pipe outlet free of oxide and such materials as may collect during the operation of the apparatus may be introduced, or a means of changing the relative position of the orifices may be installed, but the fundamental purpose of the disclosure remains unchanged.

In making ferric oxide, in an apparatus as described and illustrated by Figs. 1 and 2, the ferric chloride vapor is introduced into the chamber 1 through the inlet pipe 8, as indicated by the arrow 18. Water vapor in the form of superheated steam is introduced through the pipe 7 and ejected through the orifices 13. The pressure at which the water vapor is introduced into the inlet pipe 7 must be sufficient to cause the vapor to leave the orifices at a velocity above the critical velocity. In actual practice, the operator can maintain the proper pressure by observing the type of product produced. If the water vapor leaves the orifices at too low a velocity, the ferric oxide produced will be dark in color; as the velocity is increased, the color will become lighter, until the critical velocity is reached. The product at this point will be a yellow-red color, acid free, and pure ferric oxide.

The entire apparatus is heated to a suitable temperature, for example, approximately 325° C. and the vapors are also introduced at about the same temperature and in the proportion of their combining ratios, for example, as indicated by the equation $2FeCl_3 + 4H_2O = Fe_2O_3.H_2O + 6HCl$. The ferric chloride vapor as it flows through the inlet pipe 8 into the chamber 1 is drawn into the reaction zone, created by the water vapor leaving the orifices 13. The water vapor is in the state of high velocity and agitation and effects an immediate reaction with the chloride vapor. The reaction is of such a nature that any formation of partially reacted incrusted masses is eliminated and ferric oxide is formed in a dry, acid-free form. Because of the extreme state of fineness of the oxide, it floats out of the chamber, to be separated from the gaseous hydrogen chloride in another apparatus.

It may be advantageous to introduce a third gas or vapor into the reaction zone. For example, under certain conditions, it is advisable to introduce an inert gas as a means of forcing the ferric chloride vapor to flow directly into the water vapor, and to keep any portion of the water vapor from diffusing back into the ferric chloride vapor before the point of reaction. In order to accomplish this, air, which may be dry, or other gases, may be introduced through the inlet pipe 15 and caused to flow along the annular space 14 between the inlet tube 8 and the chamber 1, in such a manner as to cause a continued even flow of all vapors, in the direction as indicated by the arrow 18. This third gas may be introduced under pressure or may be drawn in by such suction as would be caused by the water leaving the orifices.

Where it is desired to produce an oxide of extreme fineness and other desirable properties, it is possible to dilute the ferric chloride vapor by the introduction of an inert gas through the inlet pipe 15. The introduction of chlorine gas, which serves a triple purpose of retarding the formation of ferrous chloride, acts as a diluting gas and causes the vapors to flow continuously as indicated by the arrow 18.

For the reaction of titanium tetrachloride vapor and water vapor, an embodiment of this invention such as has been previously described and illustrated by Figs. 1 and 2 is satisfactory. In operation, the chamber 1 is heated to a temperature of approximately 140° C. Titanium tetrachloride vapor is introduced, also at a temperature of about 140° C., through the connection 9 and flows through the inlet pipe 8 as indicated by the arrow 18. Water vapor is introduced at about 140° C. through the inlet 7 and is ejected from the orifices 13 as previously described. The products of the reaction pass on into a collecting chamber, which is attached to the reacting chamber 1 at 4. This collecting chamber may be of any such type as are now used for the separation of finely divided solid particles suspended in a gas. Air or other gases may be introduced through 15 to cause an even flow of vapors in the direction of the arrow 18 in the chamber 1, and to keep any water vapor from diffusing back into the titanium tetrachloride in inlet tube. In actual operation, one part of dry air by volume to 4 parts of induced tetrachloride vapor is sufficient to keep the vapors moving in an orderly manner. An inert gas, such as dry air, may, however, be introduced in somewhat larger quantity through 15, to dilute the titanium tetrachloride vapor so that a finer product is formed, in which case the ratio by volume of the dry air to the chloride vapor may be in the proportion of about 1 to 1.

The vapors are proportioned as indicated by the equation $TiCl_4 + 3H_2O = TiO(OH)_2 + 4HCl$. The principal titanium compound formed is indicated by the formula $TiO(OH)_2$ and may be called metatitanic acid, or may be written in the form of a hydrated oxide, thus $TiO_2.H_2O$. The fact that the compound is in the hydrated form is conducive to the formation of good oxide by subsequent calcination, as has been disclosed in the previous discussion.

The embodiment as disclosed and illustrated by Figs. 1 and 2 may be used equally advantageously for the reacting of a mixture of chloride vapors. The previously disclosed mixture of silicon and titanium oxide may be produced by admitting the vapors and reacting them with water vapor in exactly the same manner as has been disclosed for the reaction of a single vapor. The temperature of reaction, the apparatus and the admitted water vapor must be above the condensation point of the chloride having the highest boiling point. In the case of the silicon-titanium mixture, such temperature should be approximately 140° C. The vapor may be vaporized in the same chamber or be vaporized individually and mixed after vaporization. The oxide formed by reacting such vapors with water vapor, whether the vapors retain their identity as individual metallic vapors, or unite to form complex vapor, is separated from the hydrogen chloride and calcined in exactly the same manner as disclosed for a product of a single metallic oxide.

Figures 7, 8:
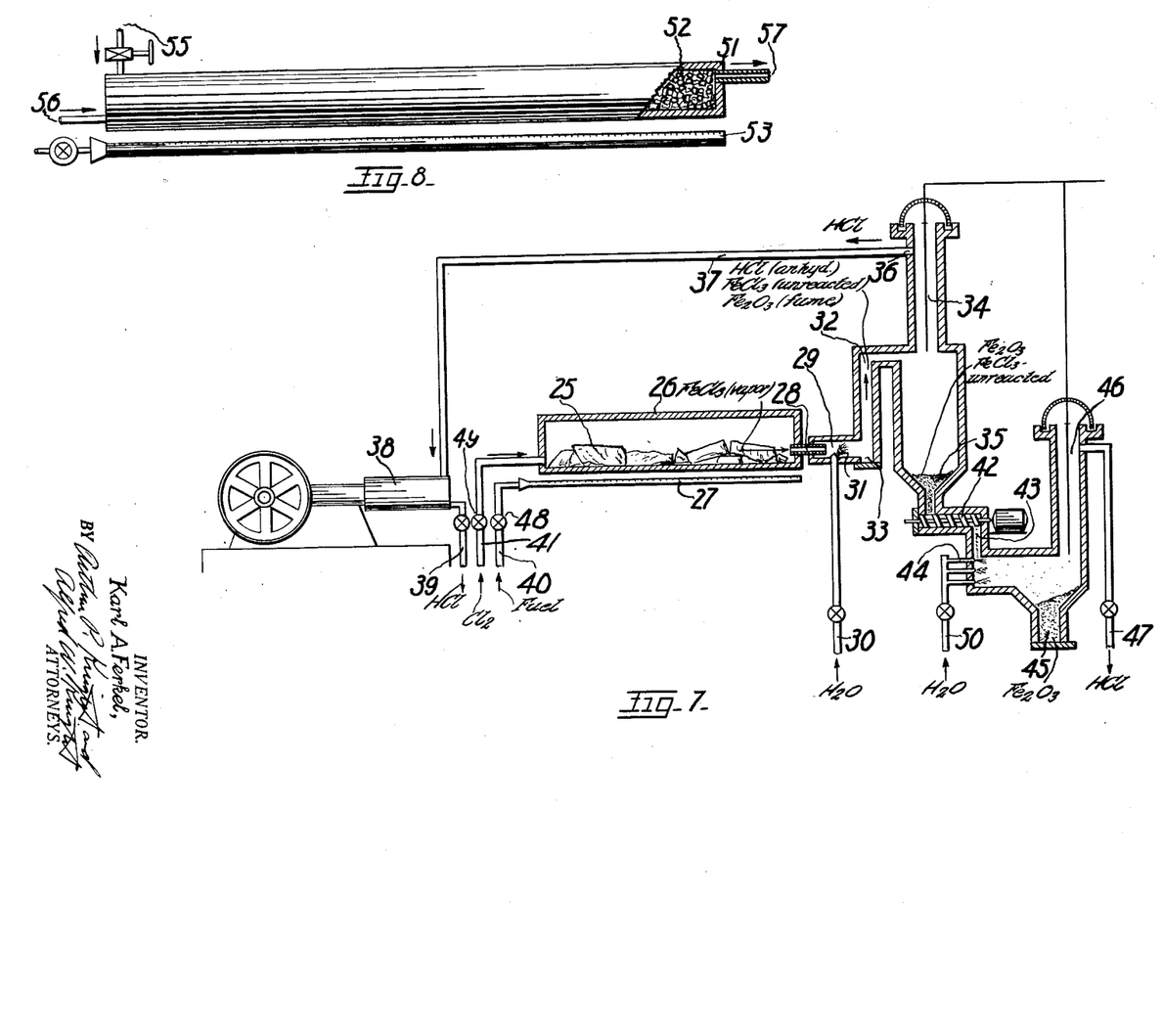
Fig. 7 is a semi-diagrammatic view illustrating a complete apparatus suitable for the manufacture of ferric oxide and dry hydrogen chloride according to this invention.
Fig. 8 represents one type of apparatus for mixing air and water vapor in certain definite proportions and for heating such mixed vapor to a desired temperature.

Fig. 7 illustrates in a diagrammatic manner an apparatus which may be used for the production of anhydrous hydrogen chloride from chlorine and the conversion of metallic iron into oxide suitable for pigment purposes through the use of the disclosed means of reacting a chloride vapor and water vapor and illustrates particularly such means of two-stage hydrolyzation as previously disclosed.

Metallic iron 25 is reacted with chlorine to form anhydrous ferric chloride in the acid-proof chamber 26. The chlorine is introduced through the pipe 41 and its volume controlled by the valve 49. The ferric chloride vapor is passed through the pipe 28 into the reaction chamber 29, which is preferably of the type of reaction chamber illustrated by Figs. 1 and 2 and as previously described in detail, but whose construction is simplified in Fig. 7 because of the small scale thereof. In said chamber, the ferric chloride vapor is reacted with water vapor, which issues from the orifices 31, in the state of turbulence and velocity, as previously disclosed. The water vapor is conveyed through the inlet pipe 30 and is introduced in such limited proportions that the hydrogen chloride formed will be anhydrous. The products of reaction, which are hydrogen chloride vapor and ferric oxide in the form of a "fume" pass into a vertical trap 32 where such heavy particles as are not desirable are allowed to settle into the chamber 33, which can be opened and cleaned at suitable intervals.

The fine floating oxide passes upward with the hydrogen chloride into the electrical collector 34, where the ferric oxide is separated from the gaseous acid. The oxide falls into the chamber 35 and the hydrogen chloride passes through the opening 36 into the pipe 37 where it is conveyed to a suitable compressor 38, and is forced through the pipe 39 into storage, or put to such uses as the occasion demands.

The screw conveyor 42, which acts as a gas-tight seal, removes the ferric oxide from the chamber 35 and causes it to fall into the vertical passageway 43 in such a manner that the oxide is acted upon by the blast of water vapor issuing from the orifices 44. This action by the water vapor, which is introduced in excess and in the turbulent dispersive form previously disclosed completely hydrolyzes any ferric chloride and frees the oxide from any acid compounds.

The water vapor may be in the form of steam or a mixture of air and water vapor such as would be obtained from the apparatus as illustrated by Fig. 8 and which consists of a chamber 51, which may be an iron pipe filled with small pieces of material such as aluminum as indicated by 52. The chamber 51 is heated to the proper temperature by the gas burner 53. Air is introduced at 56 under such conditions that the volume and moisture content is known. Sufficient water or steam is introduced through the needle valve 55 so as to prepare the proportions of water and air required for the reaction. In this manner a mixture of air-water vapor can be prepared in which the water content is greater than a normally saturated air at the same temperature. As the resulting mixture of air and water vapor pass through the tube 51, they are heated to the desired temperature and pass out through the pipe 57 to be introduced into the reaction through the pipe designated as 50 on Fig. 7.

The acid-free oxide is separated from the water vapor and acid by the electric collector 46. The oxide falls into the chamber 45, from where it is removed and calcined into the desired product. The water vapor, acid and air, if air was introduced with the water vapor, pass through the pipe 47 where the acid and water are condensed into a dilute solution, which may be concentrated or disposed of in any suitable manner.

The temperature of the chamber 26 is kept slightly above the boiling point of ferric chloride by the gas burner 27 controlled by the valve 48, so that the ferric chloride is kept as a vapor and flows into the reaction chamber 29, where the reaction takes place as previously disclosed. The burner 27 is supplied with gas by the pipe 40.

The chambers 32, 33 and 35, and the electrical collector 34 are kept at a temperature of approximately 110° C., as is the conveying screw 42 and chambers 43 and 45, and the electrical collector 46. It is important that the temperature be kept above 110° C. as at lower temperatures any water existent in the system tends to condense with the hydrogen chloride and form liquid hydrochloric acid, which makes a soft, pasty mass, with the ferric oxide, tends to attack the apparatus, and is very undesirable.

While the above description and disclosure was specifically directed to metallic iron and the production of iron oxide, it is to be understood that anhydrous chlorine can be converted into anhydrous hydrogen chloride in a similar manner through the use of similar apparatus by the conversion of other metal or metallic compounds into their chlorides and subsequently their oxides, such as, for example, metallic aluminum, or titanium carbide might be used.

A further use of such apparatus and process as disclosed makes possible the production of mixed oxides using an alloy or ore containing the elements desired in the mixed oxide. For example, titaniferous iron ore might be reduced to an alloy of iron and titanium and be substituted for metallic iron. The operation of the apparatus and the subsequent treatment of the oxides would be identical with such description given for metallic iron indicated by the numeral 25 on Fig. 7.

In order that the full import of the disclosed invention may be realized and understood, a complete disclosure of a process in which a titanium bearing ore is treated, chlorinated and hydrolyzed to produce an oxide suitable for pigment purposes through the cyclic use of hydrogen chloride will be given.

Figure 9:
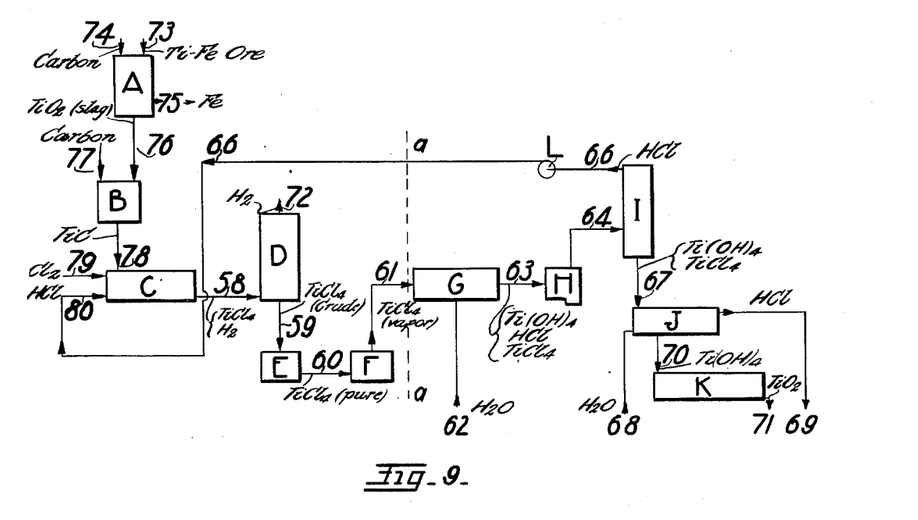
Fig. 9 shows, in flow sheet form, a process in which anhydrous hydrogen chloride is used in a cyclic manner to produce titanium dioxide from titaniferous ores from which the iron has been removed by metallization.

Fig. 9 represents diagrammatically in flow sheet form a system and apparatus which may be employed to prepare pure titanium dioxide from a titaniferous iron ore such as ilmenite, using the hydrogen chloride from the hydrolysis of the chloride in a cyclic manner, to prepare more chloride.

The lines designated by the numerals 58–80 represent connections or routing of materials.

Referring now to Fig. 9, A represents a furnace such as is commonly used to reduce iron ore to metallic iron. The titaniferous iron ore is introduced into the furnace at 73, while carbon in sufficient quantity to react with the iron present in the ore is fed in at 74. The ore and carbon are reacted at sufficient temperature to completely metallize all the iron present and such iron is removed from the furnace at 75. The titanium, which is in the form of an oxide slag, is conducted, as indicated at 76, into the furnace B, and sufficient carbon is introduced at 77 to form a carbide, and the furnace B is then heated to the proper temperature. The carbided titanium is then conducted as at 78 into the chlorinator C, which is essentially a chamber such as disclosed and illustrated and designated by the numeral 26 in Fig. 7. The titanium carbide may be introduced in a heated state or be heated after introduction into the chlorinator to a temperature sufficiently high so that dry hydrogen chloride when introduced through 80 will react and form titanium tetrachloride with the titanium carbide in the chlorinator. The gaseous products of the reaction, which are titanium tetrachloride and hydrogen, pass through 58 into the condenser D, which may be any type of standard apparatus used for condensing an acid gas into a liquid. Any gases which do not condense, such as hydrogen, pass out at 72, to be disposed of as desired. The condensed titanium tetrachloride flows through 59 into a still or other purifying means E, where it is purified by distillation or by other means such as treatment with suitable chemicals or agents for removing impurities.

The pure titanium tetrachloride thus obtained is passed into the vaporizer F as at 60. Said vaporizer may be any suitable form of apparatus adapted to receive material to be vaporized and provided with means for heating and vaporizing such material. The vaporized titanium tetrachloride is passed through 61 into the hydrolyzing chamber G, which may be such an apparatus for the reacting of titanium tetrachloride vapor with water vapor as previously described and illustrated. The water vapor may be introduced as steam or as an air-water vapor mixture, such as would be created through the use of such an apparatus as described and illustrated by Fig. 8. Water vapor is introduced at 62 in such proportion that the chloride vapor is in excess of the theoretical required for example for complete chemical combination and the resulting dry hydrogen chloride and titanium product, which is in the form of a fine fume, pass through 63 into the trap H, where any heavy particles are allowed to settle out from the fine product, which passes through 64 into the separation chamber I, where the gaseous hydrogen chloride is removed and passes through connection 66, to be used in a cyclic manner to produce more chloride upon its introduction into the chlorinator C. The pump L keeps the gases in circulation. The titanium product is conducted as shown at 67 into an apparatus J, where it is reacted with more water vapor to completely hydrolyze and remove any chloride and prepare an acid free oxide, which passes at 70 into the calciner K, where it is calcined into such oxide as desired. The apparatus J may be an enclosed chamber of the nature of an autoclave, in which the oxide may be subjected to treatment with steam under pressure and at a temperature sufficient to prevent condensation of water or acid.

Titanium dioxide passes out of the calciner at 71, to be placed in storage, while the hydrochloric acid passes off at 69, to be condensed and collected and disposed of in a suitable manner. In order to replace such acid loss as occurs during the normal operation of the apparatus and to compensate for the acid which is removed from the system, after condensation, as an aqueous solution, additional hydrogen chloride or chlorine, may be introduced in the system at 79, into the chlorinator C.

Figure 10:
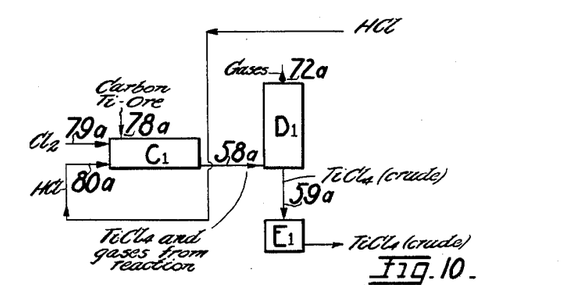
Fig. 10 shows, in flow sheet form, a modification in which crude titanium dioxide is used instead of titaniferous ores as shown in Fig. 9.

Fig. 10 represents in flow sheet form a modified procedure which may be substituted for the first portion of the process as described in connection with Fig. 9. Such a modified form is substituted when an ore such as rutile, which is essentially crude titanium dioxide is used. A mixture of ore and carbon is introduced into the chlorinator C₁ at 78a and heated until a red heat is obtained, at which temperature, the hydrogen chloride is passed into the chlorinator in cyclic manner at 80a. The titanium tetrachloride passes through 58a into the condenser D₁, along with such gaseous products of the reaction as have been formed. The subsequent procedure and apparatus is identical with that as described and illustrated by Fig. 9, and for that reason, need not be repeated.

In such a process as disclosed and illustrated by Fig. 9 and the modified form as disclosed and illustrated by Fig. 10, the entire amount of hydrogen chloride as produced from the hydrolyzation of the chloride is used in a cyclic manner to produce more chloride. In some cases, a chloride suitable for chlorination cannot be prepared from a metal or metal compound by the action of hydrochloric acid without the additional use of chlorine, as, for example, ferric chloride. Hydrogen chloride reacts upon iron to form ferrous chloride, and thus $2HCl+Fe=FeCl_2+H_2$. Hence, sufficient quantity of chlorine must be added to oxidize the ferrous chloride to ferric chloride, thus $2FeCl_2+Cl_2=2FeCl_3$. Therefore, in order to form ferric chlorides, chlorine must be introduced into the system to the amount of approximately one-third the total chlorine required to combine with the iron to form ferric chloride and hydrogen chloride to the amount approximately one-third must be removed from the system.

Figure 11:
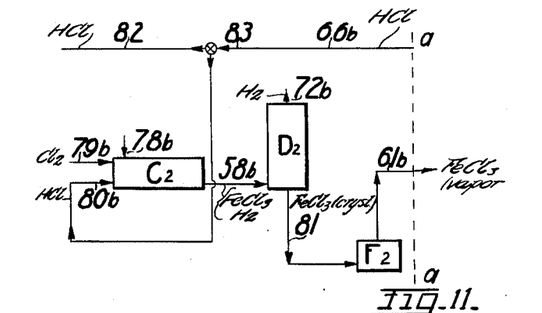
Fig. 11 shows, in flow sheet form, a modified procedure in which iron is used to prepare ferric oxide and in which only two-thirds of the hydrogen chloride is used in a cyclic manner.

There is illustrated in Fig. 11, in flow sheet form, a modified arrangement of apparatus for producing ferric oxide or similar oxide with cyclic re-use of a large part of the hydrogen chloride formed during hydrolysis.

Metallic iron is introduced at 78b into the chlorinator C₂ at such a temperature as is necessary for the formation of ferric chloride, when reacted on by a mixture of hydrogen chloride and chlorine.

Hydrogen chloride is returned from the hydrolyzing apparatus such as shown at G in Fig. 9, through 66b to the proportioning valve 83, where approximately one-third of the gas is passed through 82, into storage or any suitable use. The balance of approximately two thirds is passed into the chlorinator C at 80b. Chlorine to the equivalent of one third is passed into the chlorinator C through 79b. The resulting ferric chloride passes through 58b into the condenser D₂, where the ferric chloride is condensed into crystalline form and the gaseous products of the reaction passed out at 72b. Because of the purity of the ferric chloride it passes through 81 directly into the vaporizer F₂, from which it passes through 61b to be hydrolyzed in a manner substantially as described and illustrated by Fig. 9 in the processes previously disclosed.

Inasmuch as the procedure as illustrated and described to the right of the broken lines a—a on Fig. 9 is of the same general nature as the balance of the disclosure of the modified form, in which only two-thirds of the hydrogen chloride is used in a cyclic manner, it is needless to give repetition of what has been previously disclosed.

In order to utilize titaniferous iron ores as a source of titanium for the production of titanium dioxide, it is necessary to devise some means of eliminating or utilizing the iron content of the ore. It has been proposed to treat such titaniferous ores with chlorine or chlorine and hydrogen chloride to form titanium tetrachloride and ferric chloride. The titanium chloride is then hydrolyzed into titanium dioxide and the ferric chloride disposed of as such or hydrolyzed into ferric oxide. Such a proposed process requires additional chlorine to complete the reaction and therefore under certain economic conditions cannot be operated in a profitable manner.

Figure 12:
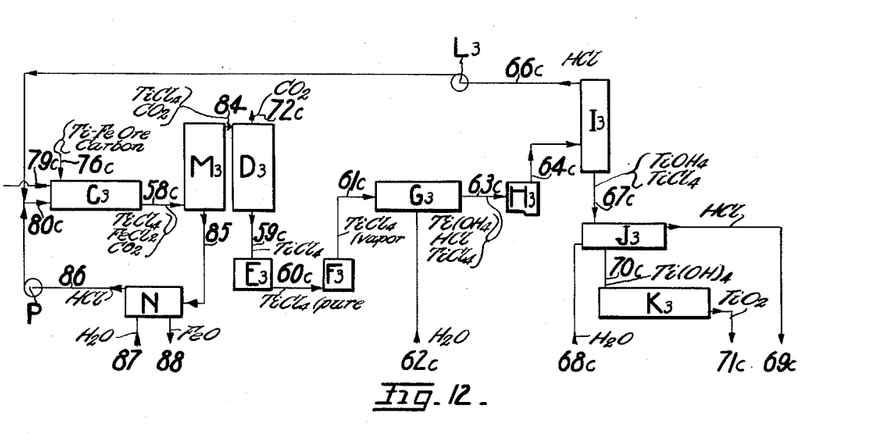
Fig. 12 shows, in flow sheet form, a process in which anhydrous hydrogen chloride is used in a cyclic manner to produce titanium dioxide from titaniferous iron ores and in which the iron is discarded as ferroso-ferric oxide.

The object of such a process as described and illustrated in flow sheet form by Fig. 12 is to use anhydrous hydrogen chloride in a cyclic manner to prepare titanium dioxide from titaniferous iron ores, without the need of introducing chlorine into the system, and without requiring separation of the iron prior to the chloridizing operation, as in the case of the system illustrated in Fig. 9. The titanium dioxide produced is of a very desirable quality and the iron oxide produced is not ferric oxide but a lower iron oxide. No particular effort is made to produce such iron oxide suitable for pigment purposes, but merely to eliminate the iron content of the ore without the loss of an appreciable amount of hydrogen chloride.

Referring now to Fig. 12, the titanium bearing mineral which consists essentially of titanium and iron oxides in complex structure is ground, mixed with carbon and fed into the chlorinating retort $C_3$ through $76c$ and is heated to such temperature so as to be reacted on by substantially anhydrous hydrogen chloride, introduced as hereinafter described, to form gaseous ferrous chloride and titanium tetrachloride. The gaseous ferrous chloride, titanium tetrachloride and any other gases or gaseous products of the reaction pass through $58c$ into the condenser $M_3$ which condenses the ferrous chloride into a solid crystalline form. Such a condenser may be any such piece of equipment commonly used for condensing a gaseous substance into crystalline form and removing it from a gaseous atmosphere, and the temperature in said condenser is maintained below the condensation temperature of ferrous chloride but above the condensation temperature of titanium tetrachloride. The crystalline ferrous chloride is removed and passed through 85 into the hydrolyzing unit N, where it is reacted with water vapor under such conditions as to produce substantially anhydrous hydrogen chloride which, with any other gas formed, passes through 86 and is forced by the pump P into the chlorinating retort $C_3$ at $80c$ where the hydrogen chloride is used to create more chlorides. The oxide formed in the hydrolyzing unit N, which is a lower oxide, such as ferrous oxide (FeO) or ferroso-ferric oxide ($Fe_3O_4$), is discharged at 88, while such water vapor as is necessary for the reaction is fed in at 87. The titanium tetrachloride and other gases pass from the condenser $M_3$ through 84 into the condenser $D_3$ where the titanium tetrachloride is condensed. Any uncondensed gases pass out through the opening $72c$ to be disposed of in a suitable manner. The condensed titanium tetrachloride, which is in liquid form, passes through $59c$ into the purifier $E_3$. The purified titanium tetrachloride then passes into the vaporizer $F_3$ at $60c$, and after being vaporized, passes into the hydrolyzer $G_3$ where it is reacted with water vapor and hydrolyzed substantially as described in the previous disclosure as illustrated by the flow sheet of Fig. 9, the hydrogen chloride formed being returned though $66c$ and used in a cyclic manner as disclosed and the titanium dioxide being removed from the calciner $K_3$ at $71c$. Any Any such hydrogen chloride lost from the cycle is replaced with more hydrogen chloride through the inlet $79c$. The parts of the apparatus shown in Fig. 12 which are not specifically referred to above are numbered to correspond to the corresponding parts in Fig. 9.

As has been previously disclosed, a very desirable metallic oxide can be produced through the hydrolyzation of a mixture of two or more metallic chlorides. The metallic chlorides used to prepare such mixed or complex oxides may be prepared by reacting chlorine or hydrogen chloride on a mixture of the crude oxides and carbon, or on an alloy of two or more metals, but due to difficulties encountered, in purification and proportioning exact amounts of chlorides for the reaction, it has been found that a preferred method is to prepare and purify the chlorides individually and to mix them intimately before hydrolyzation.

Figure 13:
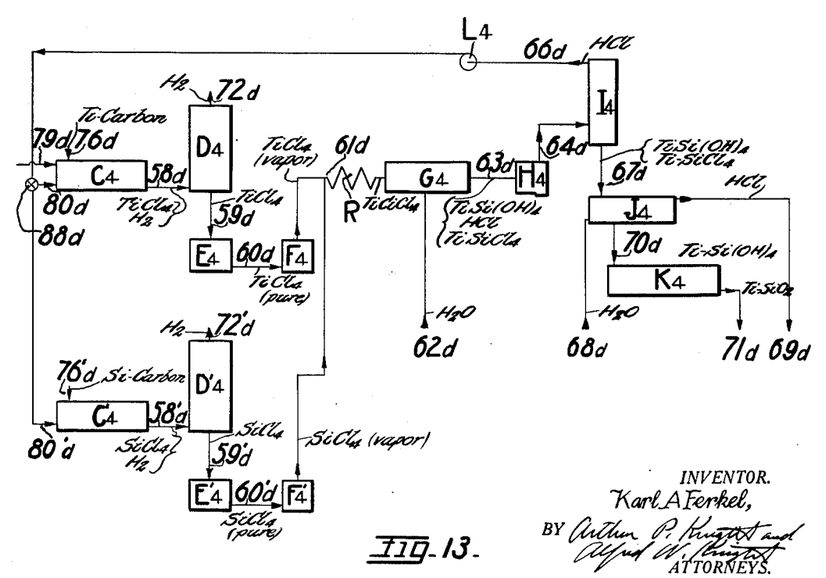
Fig. 13 shows, in flow sheet form, a process for the production of a mixed or combined oxide of two metals.

Fig. 13 shows in flow sheet form such apparatus as is necessary to produce a mixture of two oxides and for descriptive purposes, the elements silicon and titanium will be considered. It is to be understood that the invention is in no way limited to such elements, but may include any such metallic chlorides which may be vaporized and reacted with water vapor. Neither is the present invention limited to an oxide of two elements, but may include three or more, as for example, a very desirable oxide may be prepared by hydrolyzing a mixture of chlorides of titanium silicon and aluminum.

In the case of titanium and silicon, and referring to the apparatus as shown in Fig. 13, crude titanium oxide and carbon, or titanium carbide, is fed into the chlorinator $C_4$ at $76d$, while silicon carbide or metallic silicon is fed into the chlorinator $C'_4$ at $76'd$. The two chlorinators are heated to such temperatures that hydrogen chloride, when fed into the chlorinators $C_4$ and $C'_4$ through $80d$ and $80'd$, causes the formation of titanium tetrachloride and silicon chloride respectively. The titanium tetrachloride passes into the condenser $D_4$ through $58d$ where it is condensed and passes through $59d$ to be purified at $E_4$. After purification it passes into the vaporizer $F_4$ at $60d$, and after vaporization, is passed into the mixing apparatus R at $61d$.

The silicon chloride passes from the chlorinator $C'_4$ into the condenser $D'_4$ through $58'd$, where, after condensation, it passes through $59'd$ into $E'_4$, whence, after purification, it passes through $60'd$ into $F'_4$ to be vaporized, and passed into the mixing apparatus R at $61d$. The two chlorides are thoroughly mixed in the mixing apparatus R, which may be any suitable apparatus or system of baffles which cause intimate mixing of gases. After being thoroughly mixed, the chlorides are hydrolyzed in $G_4$ and the products of the reaction separated and treated in an identical manner as disclosed in detail and as illustrated by and described in connection with Fig. 9. The anhydrous hydrogen chloride is forced by the pump $L_4$ to the proportioning valve $88d$ where the hydrogen chloride is proportioned into suitable volumes in accordance with the desired oxide ratios and delivered through $80d$ and $80'd$.

While, as a general rule, a preferred method of producing the mixed oxides is to mix the chloride vapors in such an apparatus as designated by R before their introduction into the hydrolyzer $G_4$, it is sometimes desirable to introduce the vapors into the hydrolyzer $G_4$ through separate inlet pipes depending upon the dispersive turbulent action of the water vapor for sufficient mixing. If such be the case the mixing apparatus R is removed and the chloride vapors pass directly from the vaporizer $F_4$ and $F'_4$ into the hydrolyzer $G_4$ in separate pipes.

I claim:

1. The method of producing finely divided metal oxide pigment of high purity which comprises contacting metal chloride vapor and water vapor under conditions of high relative velocity and great turbulence and at a suitable temperature to cause reaction therebetween to form hydrogen chloride vapor and solid metal oxide in sufficiently finely divided condition to remain in suspension in the surrounding gaseous medium including said hydrogen chloride vapor, carrying said metal oxide out of the region of said reaction in suspension in said gaseous medium, and subsequently separating said metal oxide from said gaseous medium.

2. The method of producing finely divided metal oxide pigment of high purity which comprises introducing metal chloride vapor and water vapor into a reaction chamber at suitable temperature to effect reaction therebetween and formation of solid metal oxide and hydrogen chloride vapor, at least one of said introduced vapors being introduced at high velocity and in such manner as to produce great turbulence at the point of contact of said vapors and thus cause the metal oxide to be formed in finely divided condition and free from incrusted particles and to also induce movement of the products of reaction in a direction away from the position of introduction of the vapors and thus quickly remove said products of reaction from further contact with the introduced vapors, the finely divided condition of said metal oxide causing it to remain in suspension in the surrounding gaseous medium including said hydrogen chloride vapor and be carried thereby away from the region of said reaction, removing from said chamber gaseous medium including said hydrogen chloride vapor, together with said suspended metal oxide, and subsequently separating said metal oxide from said gaseous medium.

3. The method of producing finely divided metal oxide pigment of high purity which comprises maintaining a flow of metal chloride vapor longitudinally within a reaction chamber, introducing water vapor into said metal chloride vapor at high velocity and in such manner as to cause great turbulence and intimate contact and reaction between said vapors, resulting in formation of hydrogen chloride vapor and of solid metal oxide in such finely divided condition as to remain suspended in the surrounding gaseous medium including said hydrogen chloride vapor, maintaining a flow of said gaseous medium and suspended metal oxide out of said reaction chamber and out of the region of said reaction in a direction away from the position of introduction of said metal chloride vapor, and subsequently separating said metal oxide from said gaseous medium.

4. The method of producing finely divided metal oxide pigment of high purity and substantially anhydrous hydrogen chloride which comprises contacting metal chloride vapor with water vapor under conditions of great turbulence and at a suitable temperature to cause reaction therebetween to form finely divided solid metal oxide and hydrogen chloride vapor, removing said hydrogen chloride vapor with said metal oxide in suspension therein from the region of said reaction, and subsequently separating said metal oxide and said hydrogen chloride vapor and separately removing the same, said metal chloride and water vapors being introduced in such proportions as to cause substantially complete utilization of said water vapor in said reaction and thus cause said hydrogen chloride vapor to be obtained in substantially anhydrous condition.

5. The method of producing finely divided acid-free metal oxide pigment of high purity which comprises contacting metal chloride vapor with water vapor under conditions of great turbulence and at a suitable temperature to cause reaction therebetween to form finely divided, solid metallic oxide and hydrogen chloride vapor, removing said hydrogen chloride vapor with said metal oxide in suspension therein from the region of said reaction, subsequently separating said metal oxide and said hydrogen chloride vapor, said metal chloride and water vapors being contacted in such proportions as to cause substantially complete utilization of said water vapor in said reaction and thus cause said hydrogen chloride vapor to be obtained in substantially anhydrous condition, and subsequently treating the separated metal oxide by contact with a further quantity of water vapor at a suitable temperature to complete hydrolysis thereof and produce acid-free oxide.

6. The method as set forth in claim 5, in which the step of treating said separated metallic oxide with additional water vapor is carried out by directing a dispersive jet of water vapor into intimate contact with said metallic oxide.

7. The method as set forth in claim 5, in which said step of treating said metal oxide with a further quantity of water vapor is carried out by placing the metal oxide in a closed container and introducing water vapor into said container under relatively high pressure and at a sufficient temperature to prevent condensation of water or acid.

8. The method of producing finely divided metal oxide pigment of high purity which comprises reacting hydrogen chloride vapor upon a suitable metal or metal-bearing compound at such temperature as to cause formation and vaporization of metal chloride, condensing and collecting said metal chloride, vaporizing said metal chloride, contacting the metal chloride vapor so produced with water vapor under conditions of great turbulence and at a suitable temperature to cause reaction therebetween to form finely divided solid metal oxide and hydrogen chloride vapor, removing said hydrogen chloride vapor with said metal oxide in suspension therein from the region of said last reaction, subsequently separating said metal oxide from said hydrogen chloride vapor, said metal chloride and water vapors being contacted in such proportions as to cause substantially complete utilization of said water vapor in said reaction and thus cause said hydrogen chloride vapor to be obtained in substantially anhydrous condition, and returning the substantially anhydrous vapor thus separated for treatment of a further quantity of metal or a metal-bearing compound, in cyclic operation.

9. The method as set forth in claim 8, and comprising in addition the step of treating the separated metal oxide with a further quantity of water vapor in a separate operation, to complete the hydrolysis thereof and convert the same to acid-free metal oxide.

10. The method of producing ferric oxide which comprises reacting upon one part of metallic iron with approximately two parts of hydrogen chloride and approximately one part of chlorine, at such temperature as to produce ferric chloride vapor, condensing and collecting such ferric chloride, vaporizing the ferric chloride so obtained, contacting the vaporized ferric chloride with water vapor under conditions of great turbulence and at a suitable temperature to cause reaction therebetween to form finely divided solid ferric oxide and hydrogen chloride vapor, removing said hydrogen chloride vapor with said ferric oxide in suspension therein from the region of said last reaction and separating said ferric oxide from said hydrogen chloride vapor, said metal chloride and water vapors being contacted in such proportions as to cause substantially complete utilization of said water vapor in said reaction and thus cause said hydrogen chloride vapor to be obtained in substantially anhydrous condition and returning the substantially anhydrous hydrogen chloride vapor thus obtained for treatment of a further quantity of metallic iron in cyclic operation.

11. The method of producing acid-free metal oxide which comprises maintaining a flow of metal chloride vapor longitudinally within a reaction chamber, introducing water vapor into said metal chloride vapor at high velocity and in such manner as to cause great turbulence and intimate contact and reaction between said vapors, resulting in formation of hydrogen chloride vapor and of solid metal oxide in such finely divided condition as to remain suspended in the surrounding gaseous medium including said hydrogen chloride vapor, while introducing an inert gas along with said metal chloride vapor so as to promote flow of said vapor into contact with the water vapor and prevent back flow of products of reaction into the incoming metal chloride vapor and to also dilute said vapors in the region of said reaction, maintaining a flow of said gaseous medium and suspended metal oxide out of the region of said reaction in a direction away from the position of introduction of said metal chloride vapor, and subsequently separating said metal oxide from said gaseous medium.

12. The method of producing acid-free metal oxide which comprises contacting metal chloride vapor and water vapor under conditions of great turbulence and at a suitable temperature to cause reaction therebetween to form solid metal oxide and hydrogen chloride vapor, one of said contacting vapors being introduced in admixture with an inert gas and at high velocity and in such manner as to create said conditions of great turbulence, carrying said metal oxide out of the region of said reaction in suspension in the surrounding gaseous medium including said inert gas and said hydrogen chloride vapor, and subsequently separating said metal oxide from said gaseous medium.

13. The method of producing acid-free metal oxide which comprises contacting metal chloride vapor and water vapor under such condition and at such temperature as to cause formation of hydrogen chloride vapor and finely divided solid metal oxide in hydrated condition, collecting said metal oxide separate from the major portion of said hydrogen chloride vapor, and subsequently calcining said metal oxide to de-hydrate the same and to cause the water vapor so driven off to displace residual hydrogen chloride vapor contained in said metal oxide.

14. The method as set forth in claim 13, said metal oxide being maintained above the condensation temperature of hydrochloric acid from the time of formation thereof until calcination thereof.

15. The method of producing metal oxide which comprises contacting metal chloride vapor and water vapor under conditions of great turbulence and at a temperature above the condensation temperature of hydrochloric acid and water but below the dehydrating temperature of the oxide of said metal, resulting in formation of hydrogen chloride vapor and of the oxide of said metal in hydrated condition and sufficiently finely divided to be carried away in suspension in the surrounding gaseous medium including said hydrogen chloride vapor, and subsequently separating said metal oxide from said gaseous medium.

16. The method of producing metal oxide which comprises contacting metal chloride vapor and water vapor under conditions of great turbulence and at a temperature above the condensation temperature of hydrochloric acid and water and only slightly above the vaporizing temperature of said metal chloride, resulting in formation of hydrogen chloride vapor and of metal oxide in finely divided condition, carrying said metal oxide out of the region of reaction in suspension in the surrounding gaseous medium including said hydrogen chloride vapor, and subsequently separating said metal oxide from said gaseous medium.

17. The method of producing ferric oxide which comprises contacting ferric chloride vapor and water vapor under conditions of great turbulence and at a temperature of approximately 325° C., so as to cause formation of hydrogen chloride vapor and of finely divided solid ferric oxide, carrying said ferric oxide out of the region of reaction in suspension in surrounding gaseous medium including said hydrogen chloride vapor, and subsequently separating said ferric oxide from said gaseous medium.

18. The method of producing titanium dioxide which comprises contacting titanium tetrachloride vapor and water vapor under conditions of great turbulence and at a temperature of approximately 140° C., so as to cause formation of hydrogen chloride vapor and finely divided solid titanium dioxide, carrying said titanium dioxide out of the region of reaction in suspeusion in the surrounding gaseous medium including said hydrogen chloride vapor, and subsequently separating said titanium dioxide from said gaseous medium.

19. The method of producing an intimate mixture of oxides of different metals which comprises bringing water vapor into contact with mixed vapors of chlorides of a plurality of different metals, so as to cause the formation of hydrogen chloride vapor and of finely divided mixed solid oxides of said metals, carrying said mixed oxides out of the region of reaction in suspension in the surrounding gaseous medium including said hydrogen chloride vapor, and subsequently separating said mixed oxides from said gaseous medium.

20. The method of producing an intimate mixture of oxides of different metals which comprises separately producing the chlorides of a plurality of different metals, vaporizing said chlorides, thoroughly mixing said vapors together, bringing the mixed chloride vapors into contact with water vapor so as to cause formation of hydrogen chloride vapor and of finely divided solid oxides of said metals, carrying said oxides out of the region of reaction in suspension in the surrounding gaseous medium including said hydrogen chloride vapor, and subsequently separating said oxides from said gaseous medium.

21. The method of producing an intimate mixture of oxides of different metals which comprises separately producing chlorides of a plurality of different metals, vaporizing said separate chlorides, separately introducing the respective metal chloride vapors so produced into a reaction chamber, also introducing water vapor into said chamber at high velocity and in such manner as to produce great turbulence adjacent the point of introduction thereof and thus cause thorough mixing of the vapors so introduced and formation of hydrogen chloride vapor and of finely divided mixed solid oxides of said metals, carrying said mixed oxides out of the region of reaction in suspension in the surrounding gaseous medium including said hydrogen chloride vapor, and subsequently separating said mixed oxides from said gaseous medium.

22. The method of producing finely divided metal oxide pigment of high purity and substantially anhydrous hydrogen chloride which comprises contacting metal chloride vapor with water vapor at a suitable temperature to cause reaction therebetween to form finely divided solid metal oxide and hydrogen chloride vapor, and separating said metal oxide from said hydrogen chloride vapor, said metal chloride and water vapors being introduced in such proportions as to cause substantially complete utilization of said water vapor in said reaction and thus cause said hydrogen chloride vapor to be obtained in substantially anhydrous condition.

23. An apparatus for producing metal oxide comprising a reaction chamber, vapor inlet means opening into said chamber adjacent one end thereof, a second vapor inlet means opening into said reaction chamber at a position between the opening of said first-named vapor inlet means and the opposite end of said chamber and provided with orifice means adapted to deliver vapor into said chamber transversely thereof and at high velocity, means for producing metal chloride vapor, means connecting said vapor producing means to one of said vapor inlet means, a source of water vapor, means connecting said source of water vapor to the other of said vapor inlet means, and means for removing vapor and solid material from said opposite end of said reaction chamber.

24. An apparatus as set forth in claim 23 and comprising, in addition, a source of inert gas and means connecting said source to said first-named vapor inlet means.

25. An apparatus as set forth in claim 23 and comprising, in addition, a source of inert gas and means connecting said source to said second vapor inlet means.

26. An apparatus for producing metal oxide by hydrolysis of metal chloride vapor comprising a reaction chamber, vapor inlet means adapted to deliver vapor into said chamber substantially longitudinally thereof, a second vapor inlet means adapted to deliver vapor into said reaction chamber at a point beyond the point of introduction of said first-named vapor and in a direction inclined with respect to the longitudinal movement of said first-named vapor, means for producing metal chloride vapor, means connecting said vapor producing means to one of said vapor inlet means, a source of water vapor, means connecting said source of water vapor to the other of said inlet means, means for heating said reaction chamber, and means for removing vapor and solid material from said chamber.

27. The method of producing a finely divided metal oxide pigment of high purity which comprises introducing metal halide vapor into a reaction chamber and producing a flow of such halide vapor longitudinally within said chamber, introducing water vapor into said halide vapor flow at high velocity and in such manner as to create turbulence and cause reaction thereof with said metal halide vapor to form solid metal oxide and gaseous hydrogen halide, said turbulent condition causing the metal oxide to be formed in sufficiently finely divided condition to remain in suspension in the flowing gaseous medium, producing a continued longitudinal flow of gaseous medium, including said hydrogen halide and carrying said suspended metal oxide, away from the region of said reaction and in a direction away from the position of introduction of said metal halide vapor, and subsequently separating said metal oxide from said gaseous medium.

KARL A. FERKEL.